(12) United States Patent
Bayer et al.

(10) Patent No.: US 9,115,028 B2
(45) Date of Patent: Aug. 25, 2015

(54) CELLULOSE ETHER SUITABLE FOR THE EXTRUSION OF CEMENT BOUND ARTICLES WITH IMPROVED PROPERTIES

(75) Inventors: Roland Bayer, Walsrode (DE); Marc Schmitz, Verden (DE)

(73) Assignee: Dow Global Technologies LLC, Midland, MI (US)

( * ) Notice: Subject to any disclaimer, the term of this patent is extended or adjusted under 35 U.S.C. 154(b) by 891 days.

(21) Appl. No.: 13/331,607

(22) Filed: Dec. 20, 2011

(65) Prior Publication Data

US 2012/0160132 A1 Jun. 28, 2012

Related U.S. Application Data

(60) Provisional application No. 61/425,862, filed on Dec. 22, 2010.

(51) Int. Cl.

| C04B 24/38 | (2006.01) |
|---|---|
| C04B 28/14 | (2006.01) |
| C04B 28/02 | (2006.01) |
| C04B 28/10 | (2006.01) |
| C04B 111/00 | (2006.01) |
| C04B 111/34 | (2006.01) |

(52) U.S. Cl.
CPC ............... *C04B 28/14* (2013.01); *C04B 24/383* (2013.01); *C04B 28/02* (2013.01); *C04B 28/10* (2013.01); *C04B 2111/00129* (2013.01); *C04B 2111/34* (2013.01)

(58) Field of Classification Search
CPC ...... C04B 24/383; C04B 28/02; C04B 28/10; C04B 28/14; C04B 2111/34; C04B 2111/00129; C08B 11/00; C08B 11/02; C08B 11/04; C08B 11/08; C08B 11/193; C09D 101/26; C09D 101/28; C09D 101/284
USPC ........ 106/172.1, 730, 805; 264/176.1, 211.11
See application file for complete search history.

(56) References Cited

U.S. PATENT DOCUMENTS

| 4,588,772 A | 5/1986 | Bohmer et al. |
|---|---|---|
| 4,654,085 A * | 3/1987 | Schinski ............... 524/5 |
| 5,372,642 A | 12/1994 | Bartz et al. |
| 6,228,416 B1 | 5/2001 | Reibert et al. |
| 7,288,149 B2 | 10/2007 | Rydgren et al. |
| 7,371,279 B2 * | 5/2008 | Bayer et al. ............ 106/805 |
| 7,588,635 B2 * | 9/2009 | Yamakawa et al. ...... 106/805 |
| 2004/0225035 A1 | 11/2004 | Schlesiger et al. |

FOREIGN PATENT DOCUMENTS

| CN | 1764612 A | 4/2006 |
|---|---|---|
| DE | 3909070 A1 | 9/1990 |
| DE | 10304816 A1 | 8/2004 |
| EP | 0573847 A1 | 12/1993 |
| JP | 60-103059 A * | 6/1985 |
| JP | 1294555 | 11/1989 |
| KR | 10-2009-0080333 * | 7/2009 |
| WO | 0116048 | 3/2001 |
| WO | 2010104310 | 9/2010 |

OTHER PUBLICATIONS

Derwent-Acc-No. 2009-A20919, abstract of Korean Patent Specification No. KR 824116 B1 (Apr. 2008).*
Derwent-Acc-No. 2010-H59940, abstract of Korean Patent Specification No. KR 2010068808 A (Jun. 2010).*

* cited by examiner

Primary Examiner — Anthony J Green
(74) Attorney, Agent, or Firm — Andrew E. C. Merriam

(57) ABSTRACT

The present invention relates to an extrudable hydraulic or non-hydraulic binding composition with improved properties with respect to crack formation and a method of making such a composition. The invention further relates to a method of decreasing or avoiding the formation of cracks of an extruded hydraulic or non-hydraulic binding composition and to a method of making an extruded article having less or no cracks. Furthermore, the invention is directed to a cellulose ether providing an extrudable hydraulic or non-hydraulic binding composition with improved properties with respect to crack formation.

11 Claims, No Drawings

CELLULOSE ETHER SUITABLE FOR THE EXTRUSION OF CEMENT BOUND ARTICLES WITH IMPROVED PROPERTIES

The application claims priority to U.S. Application No. 61/425,862, filed Dec. 22, 2010.

The present invention relates to an extrudable hydraulic or non-hydraulic binding composition with improved properties with respect to crack formation and a method of making such a composition. The invention further relates to a method of decreasing or avoiding the formation of cracks of an extruded hydraulic or non-hydraulic binding composition and to a method of making an extruded article having less or no cracks. Furthermore, the invention is directed to a cellulose ether providing an extrudable hydraulic or non-hydraulic binding composition with improved properties with respect to crack formation.

BACKGROUND OF THE INVENTION

When extruding hydraulic or non-hydraulic binding compositions, for example cement based pasty materials obtained by mixing inorganic particles with water and auxiliary components, in order to manufacture articles like cement profiles the problem of crack formation may arise leading to articles suffering from having a smooth surface.

JP1294555A is directed to an admixture for extrusion molded articles of cement and addresses the phenomenon and problem of dehydration when extrusion molding aqueous kneaded material whose main constituent is cementitious material leading to extrusion failure. As a solution for this phenomenon a cementitious admixture is provided comprising one or more of various alkycellulose ether and hydroxyalkyl alkycellulose ether having a particle size of not more than 100 µm wherein at least 50% by weight have not more than 50 µm. Furthermore, these cellulose ether have a degree of polymerization in the range of 200 to 1500.

Today cellulose ethers like hydroxypropyl methylcellulose (HPMC) and/or cellulose ether having a very low particle size are used as auxiliary compounds in extrudable compositions. These cellulose ethers are relatively expensive either as such or due to costly grinding procedures after production.

Therefore, the problem addressed by the invention was to provide an extrudable hydraulic or non-hydraulic binding composition, e.g. based on cement or gypsum or lime or hydrated lime, having improved properties with respect to crack formation using lower priced means than HPMC's and/or very fine grinded cellulose ethers. A further problem addressed by the invention was to provide a method of decreasing or avoiding the formation of cracks of an extruded hydraulic or non-hydraulic binding composition.

SUMMARY OF THE INVENTION

The inventors have now found that a certain type of cellulose ether, namely a hydroxyethyl methyl cellulose (HEMC) having specific substitution degrees DS (Me) and MS (HE), if added to a base hydraulic or non-hydraulic binding composition effectively decreases or even avoids the formation of cracks of the corresponding extruded hydraulic or non-hydraulic binding composition.

In a first aspect of the invention, there is provided a cellulose ether as compound in an extrudable hydraulic or non-hydraulic binding composition, wherein the cellulose ether is a hydroxyethyl methyl cellulose having a methyl group substitution degree DS (Me) of above 1.5 and a hydroxyethyl group substitution degree MS (HE) in the range of 0.02. to 0.18.

In a second aspect of the invention, there is provided an extrudable hydraulic or non-hydraulic binding composition comprising the cellulose ether according to the invention.

In a third aspect of the invention, there is provided a method of making an extrudable hydraulic or non-hydraulic binding composition having improved properties with respect to crack formation comprising the steps of: a) providing a base hydraulic or non-hydraulic binding composition; and b) obtaining the extrudable hydraulic or non-hydraulic binding composition after admixing a cellulose ether according to the invention to the base hydraulic or non-hydraulic binding composition.

In a fourth aspect of the invention, there is provided a method of decreasing or avoiding the formation of cracks of an extruded hydraulic or non-hydraulic binding composition comprising the steps of: a) providing a base hydraulic or non-hydraulic binding composition; b) obtaining an extrudable hydraulic or non-hydraulic binding composition after admixing a cellulose ether according to the invention to the base hydraulic or non-hydraulic binding composition; and c) extruding the extrudable hydraulic or non-hydraulic binding composition through an extruder.

In a fifth aspect of the invention, there is provided a method of making an extruded article having less or no cracks on basis of a hydraulic or non-hydraulic binding composition comprising the steps of: a) providing a base hydraulic or non-hydraulic binding composition; b) obtaining an extrudable hydraulic or non-hydraulic binding composition after admixing a cellulose ether according to the invention to the base hydraulic or non-hydraulic binding composition; c) extruding the extrudable hydraulic or non-hydraulic binding composition through an extruder; and d) obtaining the article by finishing step c).

In a sixth aspect of the invention, there is provided an extruded article comprising a cellulose ether according to the invention, particularly if manufactured according to the method of the invention.

In a seventh aspect of the invention, there is provided the use of a cellulose ether according to the invention as compound of an extrudable hydraulic or non-hydraulic binding composition; or in the manufacture of an extrudable hydraulic or non-hydraulic binding composition; or in the manufacture of an extruded article on basis of a hydraulic or non-hydraulic binding composition.

It is surprising that a specific type of cellulose ether, namely a hydroxyethyl methyl cellulose, having a methyl group substitution degree DS of above 1.5 and a very low hydroxyethyl group substitution degree MS in the range of 0.02. to 0.18, decreases or even avoids the presence of cracks of an extruded hydraulic or non-hydraulic binding composition if admixed to said binding composition prior to extruding. It is particularly surprising that this advantageous effect can also be achieved if the cellulose ether admixed to said binding composition has a relatively large particle size.

DETAILED DESCRIPTION OF THE INVENTION

As already mentioned the present invention provides a specific hydroxyethyl methyl cellulose as compound in a hydraulic or non-hydraulic binding composition. The thus modified binding composition shows decreased or no formation of cracks of the composition after its extrusion.

The cellulose ether according to the invention is a hydroxyethyl methyl cellulose having a methyl group substitution degree DS (Me) of above 1.5 and a hydroxyethyl group substitution degree MS (HE) in the range of 0.02. to 0.18.

Hydroxyethyl methyl cellulose (HEMC) is less expensive compared to, for example, Hydroxypropyl methyl cellulose (HPMC). Therefore, an advantage of the present invention is that the above addressed problem of crack formation can be solved by the use of relatively low priced HEMC having a specific range of DS and MS as additive in the hydraulic or non-hydraulic binding compositions.

In a preferred embodiment of the invention the hydroxyethyl methyl cellulose has a methyl group substitution degree DS (Me) in the range of 1.5 to 2.9, more preferred in the range of 1.6 to 2.8, and most preferred in the range of 1.7 to 2.7, and a hydroxyethyl group substitution degree MS (HE) in the range of 0.03 to 0.16, more preferred in the range of 0.04 to 0.14, and most preferred in the range of 0.05 to 0.12.

Beside the substitution degrees DS and MS the degree of polymerization of the cellulose ether and/or the viscosity of the cellulose ether if dissolved in water can positively influence the crack formation properties of the composition. Furthermore, the extrudability of the binding composition can be influenced by adapting the degree of polymerization and/or the viscosity of the cellulose ether.

The hydroxyethyl methyl cellulose according to the present invention typically has an average degree of polymerization in the range of 1,300 to 3,000, preferably in the range of 1,400 to 2,800, more preferably in the range of 1,500 to 2,500, and most preferably in the range of 1,600 to 2,400, as determined by gel permeation chromatography (GPC) using dextran as standards. As used herein, to determine the "average degree of polymerization", simply take the weight average molecular weight from the GPC analysis and divide it by the mass of a substituted anhydroglucose unit (AGU) and to get the degree of polymerization, assuming that the mass of the substituted AGU is 200 g/mol.

The hydroxyethyl methyl cellulose typically used in this invention has a viscosity in the range of 20,000 and 200,000 mPas, preferably in the range of 30,000 to 170,000 mPas, more preferably in the range of 35,000 to 160,000 mPas, and most preferably in the range of 37,000 to 150,000 mPas, determined in a 2% water solution with a Haake VT550 rheometer (Thermo Fisher Scientific, Karlsruhe, Germany) at 20° C. and a shear rate of $2.55\ s^{-1}$.

As mentioned above it is advantageous if the cellulose ether need not to have a too low particle size at least in order to save grinding costs. The cellulose ether according to the invention offers the possibility to use larger particle sizes. It has been found by the inventors that at least 10% by volume, preferably at least 20% by volume, of the cellulose ether may have a particle size of more than 100 µm. Optionally, also at least 20% by volume, preferably at least 30% by volume, of the cellulose ether may have a particle size of more than 63 µm. The particle sizes and their distribution of the cellulose ether is determined here by laser diffraction ("HELOS (H1344)" laser diffraction apparatus (lense: No. 5; resolution: 4.5 µm to 875 µm) with dispersing unit "RODOS" (Sympatec GmbH).

It is a further aspect of the invention to provide an extrudable hydraulic or non-hydraulic binding composition comprising the cellulose ether described above.

The "hydraulic or non-hydraulic binding composition" of the invention may comprise as a basis cement, gypsum, lime or the like as a binding material and aggregates like quartz sand or other silicious materials as further inorganic material.

Binders here are taken to mean all inorganic binders such as cement, gypsum, hydrated lime, burnt lime, clay, silicates, fly ashes and ceramic binders. Preferred are hydraulic binders like all kinds of cement or gypsum and masses based on cement or gypsum. These hydraulic binders set as a result of incorporation of water into the crystal lattice. Also preferred are non-hydraulic binders like hydrated lime ($Ca(OH)_2$)) or lime (CaO).

Aggregates here are taken to mean all types of sands and stone flours as are customarily used in building materials. These can be, in particular, gravels, crushed sands and round-grain sands, stone chippings, ashes and flours based on quartz, lime (calcium carbonate), dolomite, kaolin, marble, glass, various types of building rubble, recycling material, fly ashes, clays, bentonites and other silicates. In principle, aggregates of the most different particle sizes may be extruded. When composing the aggregates in accordance with the profile of requirements it is also possible to combine certain grain size fractions with one another in order to set certain properties optimally.

Lightweight aggregates are also understood as aggregates. They typically have particularly low density. These can be of mineral origin, for example perlites (expanded clay), expanded glass, expanded calcium silicates or high-porosity natural sands based on quartz or lime, but they can also be of organic origin, such as expanded polystyrene, polyurethane foam, cork etc.

For the present purposes, also fibers may be present in the hydraulic or non-hydraulic binding composition. Fibres may be all types of natural or synthetic fibers such as fibers based on cellulose, bamboo, coconut, polyethylene, polypropylene, polyamide, polyacrylonitrile, carbon, glass, ceramic and other mineral fibers. Their fiber lengths and thicknesses can be varied within wide ranges.

The hydraulic or non-hydraulic binding composition may also contain further additives, for example hydrophobizing agents, redispersion powders, superabsorbers based on crosslinked acrylates and polysaccharides, lubricants (for example polyethylene oxide-homopolymers, -copolymers and -terpolymers), surfactants, accelerators, retardants, fatty acids and esters thereof, polymers based on acids, salts, amides and esters of acrylic acids and methacrylic acids, polysaccharides such as natural or derivatized starches, xanthans, glucans, welans, guar and related polysaccharides, polyvinyl alcohols including their derivatives and polymers based on urethanes.

In a typical use, the inventive cellulose ether composition is added to a mixture of inorganic components which consists of 20-100 parts of binder, 0-70 parts of aggregates, 0-30 parts of lightweight aggregates, 0-20 parts of fibers and possibly other additives, in an amount of 0.1-3% by weight, based on the mixture of inorganic components.

A typical formulation setting with a hydraulic or non hydraulic binder, i.e. a typical "extrudable hydraulic or non-hydraulic binding composition", contains the binder, aggregates, and cellulose ether according to the invention and water. Optionally, fibers and further additives like cellulose ethers other than those according to the invention may be present. Typically, all solid compounds are homogeneously mixed, then admixed with the water and further kneaded thoroughly in order to obtain an extrudable composition.

In a preferred embodiment of the invention the cellulose ether is present in the composition in an amount of 0.1 to 3.0% by weight, preferably in an amount of 0.3 to 2.5% by weight, more preferably in an amount of 0.5 to 2.2% by weight, most preferably in an amount of 0.7 to 2.0% by weight, based on the total extrudable hydraulic or non-hydraulic binding composition. "Total" means that the water which is admixed and preferably kneaded into the composition is included when the amount of cellulose ether is determined.

A further subject matter of the invention is a method of making an extrudable hydraulic or non-hydraulic binding composition having improved properties with respect to crack formation. The method comprises the following steps: Providing a base hydraulic or non-hydraulic binding composition; the base hydraulic or non-hydraulic binding composition typically comprises at least cement, gypsum, lime or the like as a binding material and aggregates. The extrudable hydraulic or non-hydraulic binding composition is then obtained after admixing a cellulose ether according to the invention and as described above to the base hydraulic or non-hydraulic binding composition. The amount of the admixed cellulose ether is preferably 0.1 to 3.0% by weight, preferably in an amount of 0.3 to 2.5% by weight, more preferably in an amount of 0.5 to 2.2% by weight, most preferably in an amount of 0.7 to 2.0% by weight, based on the total extrudable hydraulic or non-hydraulic binding composition.

The inventive process is carried out by mixing together all raw materials in any desired sequence. Generally, all dry components are first premixed dry, then admixed with a certain amount of water, and mixed again. However, it is also possible to admix the dry materials with an aqueous solution of the cellulose ether (but this will in general lead to a gel which is difficult to incorporate) or to mix all of the components and water simultaneously. It is likewise possible to admix a part or all of sand/aggregates having moisture content of less than 10%. After all components have been mixed together, they are then compressed in a single or twin-screw extruder and expressed through a die. It is possible to use extruders with and without vacuum chambers and extruders with or without cooling. A kneading step in a commercially conventional kneader may also be provided between mixing and extruding.

A further subject matter of the invention is a method of decreasing or avoiding the formation of cracks of an extruded hydraulic or non-hydraulic binding composition. The method comprises the following steps: Providing a base hydraulic or non-hydraulic binding composition as described above. Obtaining an extrudable hydraulic or non-hydraulic binding composition after admixing a cellulose ether according to the invention and as described above to the base hydraulic or non-hydraulic binding composition, followed by extruding the extrudable hydraulic or non-hydraulic binding composition through an extruder. The amount of the admixed cellulose ether is, preferably, 0.1 to 3.0% by weight based on the total extrudable hydraulic or non-hydraulic binding composition.

As an optional step the extruded hydraulic or non-hydraulic binding composition can be passed through a vacuum chamber for degassing followed by extruding the degassed extruded hydraulic or non-hydraulic binding composition through a second extruder.

As it follows from the above a further subject matter of the invention is a method of making an extruded article having less or no cracks on basis of a hydraulic or non-hydraulic binding composition. The method comprises the following steps: Providing a base hydraulic or non-hydraulic binding composition as described above. Obtaining an extrudable hydraulic or non-hydraulic binding composition after admixing a cellulose ether according to the invention and as described above to the base hydraulic or non-hydraulic binding composition. The amount of the admixed cellulose ether is (as mentioned above) preferably 0.1 to 3.0% by weight based on the total extrudable hydraulic or non-hydraulic binding composition. Then, extruding the extrudable hydraulic or non-hydraulic binding composition through an extruder and thereby obtaining the article.

Further, the surface of the article may be finished by plastifying the mixture of cellulose ether and binder via extruding through a kneading extruder or kneading zone in a separate extruder.

As described above it is an optional step to complement the step prior to the step of obtaining the article to pass the extruded hydraulic or non-hydraulic binding composition through a vacuum chamber for degassing and extruding the degassed extruded hydraulic or non-hydraulic binding composition through a second extruder.

A further subject matter of the invention is an extruded article manufactured according to the above method or an extruded article comprising a cellulose ether according to the invention and as described above.

Another subject matter of the invention is the use of a cellulose ether according to the invention as compound of an extrudable hydraulic or non-hydraulic binding composition; or in the manufacture of an extrudable hydraulic or non-hydraulic binding composition; or in the manufacture of an extruded article on basis of a hydraulic or non-hydraulic binding composition.

The examples hereinafter are intended to explain the inventive use without restricting the invention:

EXAMPLES

Procedure for the Manufacture of Extruded Cement Based Profiles 50 parts by weight of a Portland cement CEM I 32.5R, 50 parts by weight of quartz flour, 4.5 parts by weight of fibers and 0.9 part by weight of the cellulose ether (as identified in Table 1) were firstly mixed dry in a fluidized-bed mixer (manufactured by Lödige, Germany) until a homogeneous mixture was formed. 26.5 parts by weight water at 20° C. was subsequently added, the mass was mixed further and kneaded in a kneader (AMK, Aachen, Germany) for a few minutes. The mass was then immediately introduced into the feed trough of a water-cooled, single-screw extruder maintained at 20° C. (Händle 8D, screw diameter 8 cm, from Händle, Mühlacker, Germany). The mass was extruded through a perforated plate and passed through the vacuum chamber (at appr. 300 mbar) for degassing. It was then extruded through a die (flat profile, 4 cm×1 cm) and discharged onto a conveyor belt. The amount of water was held constant for each batch.

Measurement of the Elongation at Break

The elongation at break of an extruded paste is a good measurement method to correlate the crack formation and the surface properties. The elongation at break is measured with a 3-point bending strength measurement of full profiles.

For the measurement a Texture Analyzer XT Plus (producer: Texture Technologies, Scarsdale, N.Y., USA) was used. Testing details: sample size: die 40 mm×40 mm, cross-section about 17 cm$^2$. Compression die pivotable, bearing roll forward-turned pivotable, penetration speed: 10 mm/min, length/height=2.5, test preload 5 g (0.04903N, about 0.2% of expected force of break), force sensor 500 N, difference between both bearing rolls: 100 mm.

Various

All Cellulose Ethers are in a viscosity range between 37,400 and 53,400 mPas in a 2% water solution (Haake Rotovisco rheometer??source, city state??, Temp.=20° C., shear rate=2.55 s$^{-1}$) this correlates with a polymerization degree between 1600 and 1800.

The stiffness of the mass was tested on the freshly strained samples and was expressed in terms of shore hardness. All masses extruded in this way were set to a customary consistency (Shore A-hardness kept constant measured with a durometer for clays (CHT/1, manufacturer Ceramic Instruments, Sassuolo, IT)).

The resulting temperatures of the extruded profile were all at room temperature (20° C.).

The results are summarized in table 1.

| Example | CE-type | DS/MS | Particle size (vol.-% ≥100 μm) | Crack formation (no/some/many) | Wet elongation at break | Comments |
|---|---|---|---|---|---|---|
| 1 | HPMC | 1.45/0.24 | 37.80 | some | 0.289 | comparative |
| 2 | HEMC | 1.79/0.43 | 79.15 | many | 0.206 | comparative |
| 3 | HEMC | 1.81/0.19 | 48.82 | many | 0.257 | comparative |
| 4 | HEMC | 1.60/0.29 | 43.23 | many | 0.238 | comparative |
| 5 | HEMC | 1.41/0.21 | 39.78 | many | 0.275 | comparative |
| 6 | HEMC | 1.36/0.34 | 32.84 | many | 0.244 | comparative |
| 7 | HEMC | 2.00/0.06 | 80.41 | no | 0.336 | Invention/very advantageous |

What is claimed is:

1. A cellulose ether binding composition comprising an extrudable hydraulic or non-hydraulic binder and a cellulose ether is a hydroxyethyl methyl cellulose having a methyl group substitution degree DS (Me) of above 1.5 and a hydroxyethyl group substitution degree MS (HE) in the range of 0.02 to 0.18, wherein at least 10% by volume of the cellulose ether has a particle size of more than 100 μm.

2. The cellulose ether binding composition according to claim 1, wherein the cellulose ether has an average degree of polymerization in the range of 1,600 to 3,000.

3. The cellulose ether binding composition as claimed in claim 1, wherein the cellulose ether has a viscosity in the range of 20,000 and 200,000 mPas determined in a 2% water solution with a Haake VT550 rheometer at 20° C. and a shear rate of 2.55 $s^{-1}$.

4. The cellulose ether binding composition as claimed in claim 1, wherein at least 20% by volume of the cellulose ether has a particle size of more than 100 μm.

5. The cellulose ether binding composition as claimed in claim 1, wherein the composition is extrudable and is a hydraulic binding composition comprising cement or gypsum or is a non-hydraulic binding composition comprising lime or hydrated lime.

6. The composition according to claim 5, wherein the cellulose ether is present in an amount of 0.1 to 3.0% by weight based on the total extrudable hydraulic or non-hydraulic binding composition.

7. A method of making an extrudable hydraulic or non-hydraulic binding composition having improved properties with respect to crack formation comprising the steps of:
   a) providing a base hydraulic or non-hydraulic binding composition; and
   b) obtaining the extrudable hydraulic or non-hydraulic binding composition after admixing the base hydraulic or non-hydraulic binding composition with a cellulose ether in an amount of 0.1 to 3.0% by weight based on the total extrudable hydraulic or non-hydraulic binding composition, wherein the cellulose ether is a hydroxyethyl methyl cellulose having a methyl group substitution degree DS (Me) of above 1.5 and a hydroxyethyl group substitution degree MS (HE) in the range of 0.02 to 0.18, and, further wherein, at least 10% by volume of the cellulose ether has a particle size of more than 100 μm.

8. A method of decreasing or avoiding the formation of cracks of an extruded hydraulic or non-hydraulic binding composition comprising the steps of:
   a) providing a base hydraulic or non-hydraulic binding composition;
   b) obtaining an extrudable hydraulic or non-hydraulic binding composition after admixing the base hydraulic or non-hydraulic binding composition with a cellulose ether in an amount of 0.1 to 3.0% by weight based on the total extrudable hydraulic or non-hydraulic binding composition, wherein the cellulose ether is a hydroxyethyl methyl cellulose having a methyl group substitution degree DS (Me) of above 1.5 and a hydroxyethyl group substitution degree MS (HE) in the range of 0.02 to 0.18, and, further wherein, at least 10% by volume of the cellulose ether has a particle size of more than 100 μm; and,
   c) extruding the resulting extrudable hydraulic or non-hydraulic binding composition through an extruder.

9. The method as claimed in claim 8, further comprising making an extruded article having less or no cracks on basis of a hydraulic or non-hydraulic binding composition by extruding through a kneading extruder or kneading zone in a separate extruder.

10. The method as claimed in claim 8, further comprising passing the extruded hydraulic or non-hydraulic binding composition through a vacuum chamber for degassing and extruding the degassed extruded hydraulic or non-hydraulic binding composition through a second extruder.

11. A cellulose ether for use in making an extrudable hydraulic or non-hydraulic binder which is a hydroxyethyl methyl cellulose having a methyl group substitution degree DS (Me) of above 1.5 and a hydroxyethyl group substitution degree MS (HE) in the range of 0.02 to 0.18, and an average degree of polymerization in the range of 1,600 to 3,000, wherein at least 10% by volume of the cellulose ether has a particle size of more than 100 μm.

* * * * *